US008271448B2

(12) United States Patent
Parkinson et al.

(10) Patent No.: US 8,271,448 B2
(45) Date of Patent: Sep. 18, 2012

(54) METHOD FOR STRATEGIZING PROTOCOL PRESUMPTIONS IN TWO PHASE COMMIT COORDINATOR

(75) Inventors: Paul Parkinson, Mt. Royal, NJ (US); Greg Pavlik, Shamong, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 11/044,267

(22) Filed: Jan. 28, 2005

(65) Prior Publication Data

US 2006/0174224 A1    Aug. 3, 2006

(51) Int. Cl.
*G06F 7/00* (2006.01)
*G06F 17/00* (2006.01)
(52) U.S. Cl. .................. 707/661; 707/610; 707/674
(58) Field of Classification Search .................. 707/2, 8, 707/10, 202; 709/227; 717/116, 120; 719/315
See application file for complete search history.

(56) References Cited

U.S. PATENT DOCUMENTS

| | | | | |
|---|---|---|---|---|
| 5,201,044 A * | 4/1993 | Frey et al. | .................... | 714/20 |
| 5,261,089 A * | 11/1993 | Coleman et al. | ................... | 707/8 |
| 5,335,343 A * | 8/1994 | Lampson et al. | ................... | 714/19 |
| 5,390,302 A * | 2/1995 | Johnson et al. | ................... | 709/230 |
| 5,452,445 A * | 9/1995 | Hallmark et al. | .................. | 707/2 |
| 5,504,899 A * | 4/1996 | Raz | ................... | 707/10 |
| 5,638,508 A * | 6/1997 | Kanai et al. | ...................... | 714/20 |
| 5,884,327 A * | 3/1999 | Cotner et al. | ......................... | 1/1 |
| 6,101,527 A * | 8/2000 | Lejeune et al. | ................ | 709/201 |
| 6,138,169 A * | 10/2000 | Freund et al. | ................. | 719/313 |
| 6,247,023 B1 * | 6/2001 | Hsiao et al. | ........................... | 1/1 |
| 6,266,698 B1 * | 7/2001 | Klein et al. | .................. | 709/227 |
| 6,618,822 B1 * | 9/2003 | Loaiza et al. | .................. | 714/20 |
| 6,684,223 B1 * | 1/2004 | Ganesh et al. | ................. | 707/200 |
| 6,738,971 B2 * | 5/2004 | Chandrasekaran et al. | .. | 718/100 |
| 6,779,016 B1 * | 8/2004 | Aziz et al. | ..................... | 709/201 |
| 6,950,804 B2 * | 9/2005 | Strietzel | .......................... | 705/26 |
| 7,277,900 B1 * | 10/2007 | Ganesh et al. | ......................... | 1/1 |
| 7,290,056 B1 * | 10/2007 | McLaughlin, Jr. | ............ | 709/230 |
| 7,320,023 B2 * | 1/2008 | Chintalapati et al. | ......... | 709/216 |
| 7,337,441 B2 * | 2/2008 | Felt et al. | ....................... | 718/101 |
| 7,472,129 B2 * | 12/2008 | Adya et al. | .................... | 707/101 |
| 7,581,011 B2 * | 8/2009 | Teng | ............................. | 709/229 |
| 2001/0049691 A1 * | 12/2001 | Asazu | ........................ | 707/104.1 |
| 2002/0062463 A1 * | 5/2002 | Hines | .............................. | 714/38 |
| 2002/0083115 A1 * | 6/2002 | Kinder et al. | ................. | 709/101 |
| 2002/0120710 A1 * | 8/2002 | Chintalapati et al. | ......... | 709/216 |
| 2002/0138577 A1 * | 9/2002 | Teng et al. | .................... | 709/205 |
| 2002/0194242 A1 * | 12/2002 | Chandrasekaran et al. | .. | 709/101 |

(Continued)

OTHER PUBLICATIONS

Gupta et al., Revisiting Commit Processing in Distributed Database Systems, Jun. 1997, ACM, vol. 26, Issue 2, pp. 486-497.*

(Continued)

*Primary Examiner* — Wilson Lee
*Assistant Examiner* — Jessica N Le
(74) *Attorney, Agent, or Firm* — Murphy & King, P.C.

(57) ABSTRACT

A transaction processing system provides the capability to use one two-phase commit engine over multiple protocols and products, while being able to vary the log presumptions according to the requirements of each protocol and product. The transaction processing system comprises a coordinator operable to receive a commit or abort request from a transaction and to perform a two-phase commit protocol on behalf of the transaction and a recovery presumption mechanism operable to perform a recovery process on the transaction upon recovery of the transaction processing system from a failure.

9 Claims, 6 Drawing Sheets

U.S. PATENT DOCUMENTS

| | | | |
|---|---|---|---|
| 2003/0036919 A1* | 2/2003 | Felt et al. | 705/1 |
| 2003/0046298 A1* | 3/2003 | Weedon | 707/102 |
| 2003/0046342 A1* | 3/2003 | Felt et al. | 709/203 |
| 2004/0015851 A1* | 1/2004 | Newhook et al. | 717/116 |
| 2004/0030703 A1* | 2/2004 | Bourbonnais et al. | 707/100 |
| 2004/0236990 A1* | 11/2004 | Pavlik et al. | 714/15 |
| 2005/0015775 A1* | 1/2005 | Russell et al. | 719/315 |
| 2005/0066095 A1* | 3/2005 | Mullick et al. | 710/200 |
| 2007/0073621 A1* | 3/2007 | Dulin et al. | 705/50 |
| 2008/0066068 A1* | 3/2008 | Felt et al. | 718/101 |
| 2008/0215637 A1* | 9/2008 | Barnes et al. | 707/202 |

OTHER PUBLICATIONS

Al-Houmaily et al., Enhancing the Performance of Presumed Commit Protocol, Apr. 1997, ACM, pp. 131-133.*

Yu et al., A Dynamic Two-Phase Commit Protocol for Self-Adapting Services, 2004, IEEE, pp. 7-15.*

* cited by examiner

METHOD FOR STRATEGIZING PROTOCOL PRESUMPTIONS IN TWO PHASE COMMIT COORDINATOR

BACKGROUND OF THE INVENTION

1. Field of the Invention

The present invention relates to a transaction processing system and method that provide the capability to use one two-phase commit engine over multiple protocols and products, while being able to vary the log presumptions according to the requirements of each protocol and product.

2. Description of the Related Art

Many commercial transaction-processing systems rely on the two-phase commit protocol to preserve ACID properties in a unit of work that spans multiple resource managers. The two-phase commit protocol requires a series of messages to be exchanged between a transaction manager or coordinator and the resource managers that are defined by a voting process. This voting process is performed in two phases: in the first phase, resource managers are asked to checkpoint their view of the work scoped by the transaction and indicate if they were successful. In the second phase, the coordinator communicates whether or not the resource managers should make permanent and visible the changes that were check-pointed.

For this process to provide ACID guarantees in the face of a failure, the coordinator must log information to a non-volatile store (typically disk) that can be used to recover a coordinator failure. This adds further overhead to the process. In order to provide enhanced performance, presumptions may be made about the protocol to minimize the number of log writes that must be made. These are well-understood optimizations and include "presumed abort" and "presumed commit" assumptions—the absence of certain log messages indicates that the resource manager may presume that the transaction was either aborted or committed. The full protocol without presumptions is sometimes said to "presume nothing".

Different transaction models that include reifications of the protocol require, for interoperability, that the coordinator maintain fixed recovery semantics. The conventional solution is for a coordinator to include presumptions explicitly in the two-phase commit algorithm. This is inflexible especially considering the increasing requirements for interoperability in various software architectures the most directly relevant being transaction processing protocols. It is desirable to be able to use the same two phase commit coordinator in transaction managers that support different variations (based on presumptions) of the atomic transaction model. A need arises for a technique by which the log presumptions may be varied.

SUMMARY OF THE INVENTION

The present invention provides a novel way to achieve variability of presumptions. This provides the capability to use one two-phase commit engine over multiple variations of the atomic transaction protocol and products, while being able to vary the log presumptions according to the requirements of each protocol variant and product.

In one embodiment of the present invention, a transaction processing system comprises a coordinator operable to receive a commit or abort request for a transaction and to perform a two-phase commit protocol on behalf of the transaction and a transaction logging unit operable to write to log information pertaining to a transaction for use upon recovery of the transaction from a failure, wherein the logging presumption is selectable from among a plurality of logging presumptions. The log presumption mechanism may comprise a strategy pattern operable to select a log presumption from among a plurality of log presumptions. The plurality of log presumptions may comprise a log presumption for recovery protocols which make no presumption about a state of the transaction, a log presumption for recovery protocols which presume that the transaction aborted if no information to the contrary exists, a log presumption for recovery protocols which presume that the transaction committed if no information to the contrary exists. The recovery protocols mentioned may include both the transaction processing system's own recovery manager operable as well as the recovery processes initiated by the resources which participate in the transaction processing system's transactions.

If the selected log presumption is for recovery protocols which make no presumption about a state of the transaction, the transaction logging unit may be operable to write to a log information relating to the transaction when the transaction is created, to write to a log information relating to the transaction after a state change of the two-phase protocol, and to purge the information relating to the transaction from the log when the transaction is completed. If the selected log presumption is for recovery protocols that presume that the transaction aborted if no information to the contrary exists, the transaction logging unit may be operable to write to a log information relating to the transaction only when the coordinator has begun a committing phase of the two-phase commit protocol.

Variations in presumptions of the two phase commit protocol are introduced in to the two phase commit algorithms without modifications to the code that implements the algorithm itself. This is achieved by decoupling the specifics of logging behind a Strategy Pattern implementation. A Strategy Pattern is a specific software design technique used to vary a family of algorithms, encapsulate each one, and make them interchangeable. This invention induces logging behavior at each state change in the transaction by signaling the presumption strategy implementation. The specific details of the presumption are wholly encapsulated by the strategy implementation: the algorithm for the two phase commit protocol is completely agnostic about the logging strategy that is executed on behalf of the coordinator.

Dynamic selection of the strategy based on the capabilities of transaction participants can be used to create self-optimizing transaction coordinators. In this system, the transaction manager examines registered resource managers and automatically creates the most efficient presumption strategy for the two phase commit algorithm that the participants can tolerate without jeopardizing ACID guarantees for the unit of work.

DETAILED DESCRIPTION OF THE INVENTION

Figure 1:
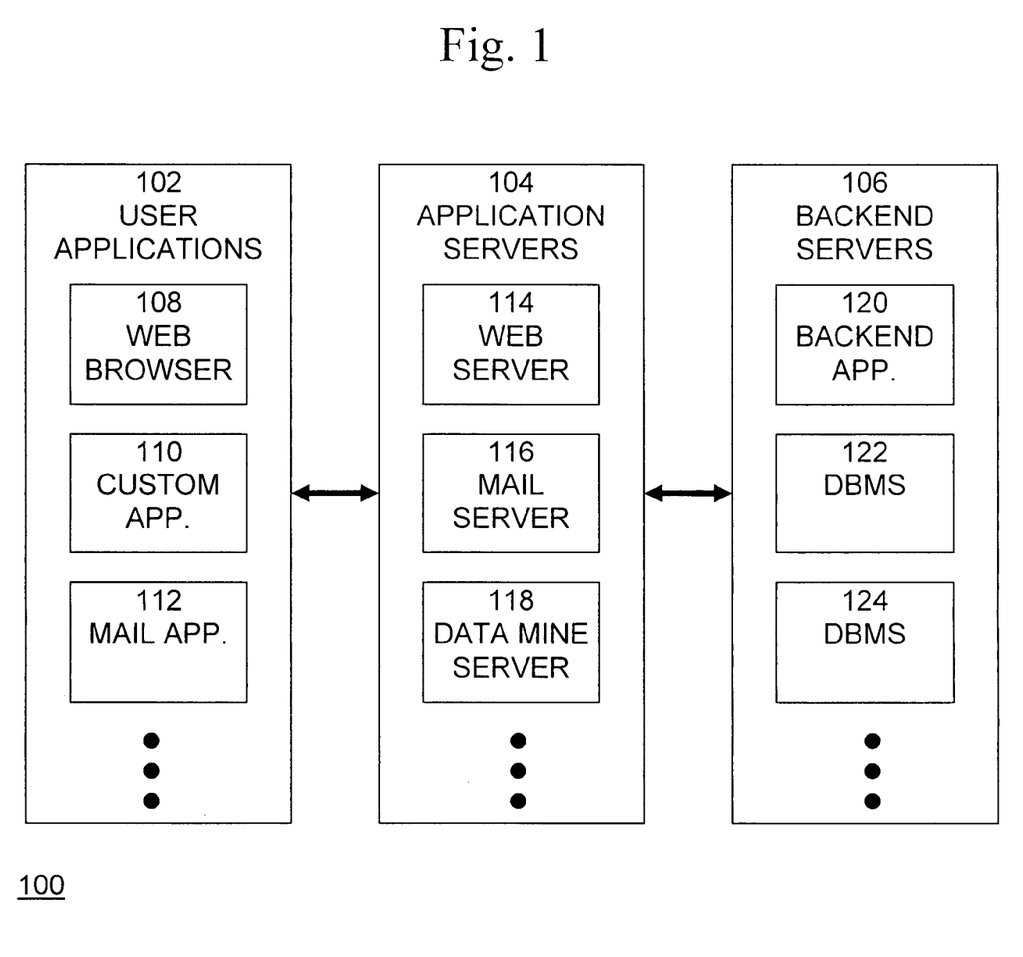
FIG. 1 is an exemplary block diagram of a system architecture, in which the present invention may be implemented.

An exemplary system architecture 100, in which the present invention may be implemented, is shown in FIG. 1. System 100 includes user applications 102, application servers 104, and backend servers 106. User applications 102 include a plurality of applications that are operated by or interface with a user, such as web browser 108, custom application 110, and mail application 112. Application servers 104 include a plurality of servers that handle application operations between user applications 102 and backend servers 106, such as web server 114, mail server 116, and data mining server 118. Application servers are typically used for complex transaction-based applications. To support high-end needs, an application server should have built-in redundancy, monitors for high-availability, high-performance distributed application services and support for complex database access. Examples of types of servers that may be included in application servers 104 include:

Web Servers: At its core, a Web server serves static content to a Web browser by loading a file from a disk and serving it across the network to a user's Web browser. This entire exchange is mediated by the browser and server talking to each other using HTTP.

IIOP servers: many commercial application servers allow access to business components via the IIOP standard. Components are exposed as distributed objects based on the Common Object Request Broker Architecture (CORBA).

Backend servers 106 include a plurality of servers, such as backend business application 120 and database management systems 122 and 124. Database management systems (DBMSs) are software that enables storing, modifying, and extracting information from a database. There are many different types of DBMSs, ranging from small systems that run on personal computers to huge systems that run on mainframes. Examples of database applications include:

computerized library systems
automated teller machines
flight reservation systems
computerized parts inventory systems From a technical standpoint, DBMSs can differ widely. The terms relational, network, flat, and hierarchical all refer to the way a DBMS organizes information internally. The internal organization can affect how quickly and flexibly you can extract information.

Figure 2A:
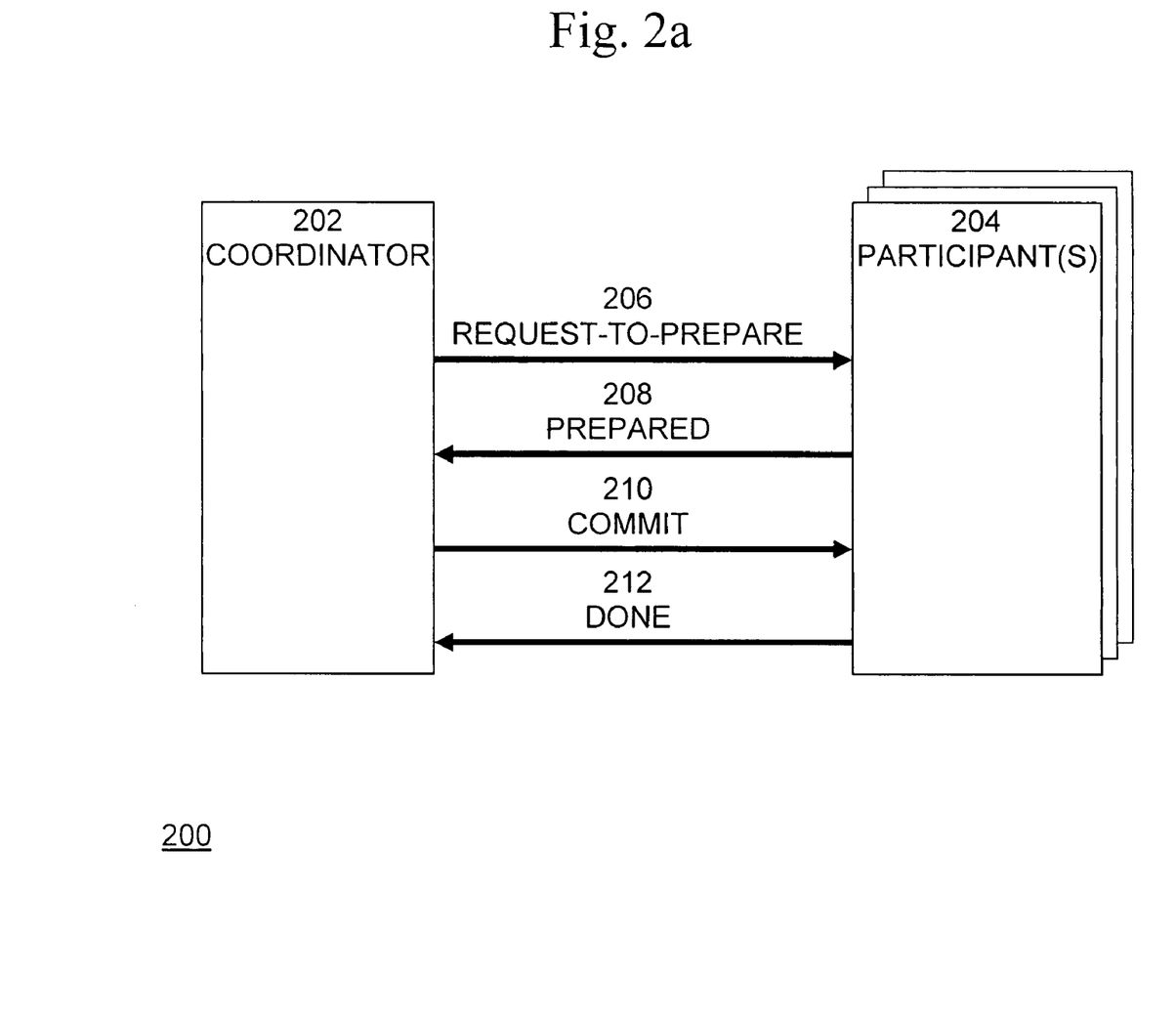
FIG. 2a is an exemplary data flow diagram of a two-phase commit protocol.
Figure 2B:
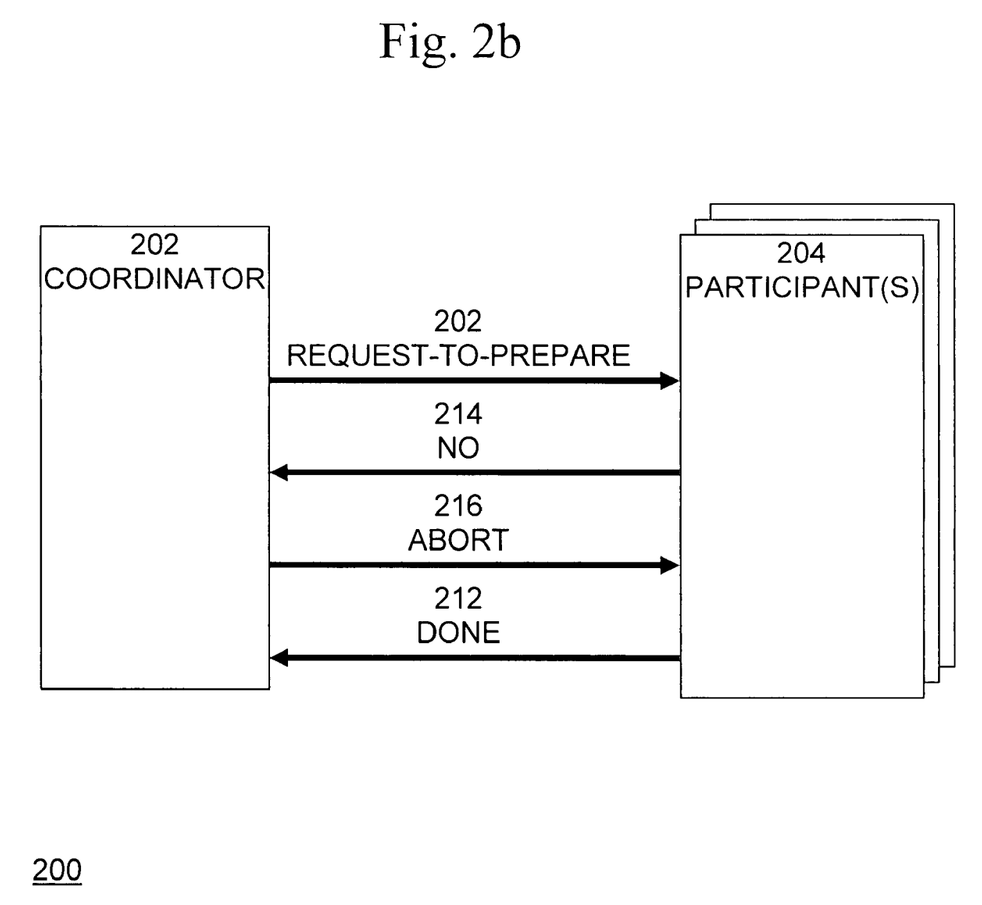
FIG. 2b is an exemplary data flow diagram of a two-phase commit protocol.

An exemplary data flow diagram of a two-phase commit protocol 200 is shown in FIGS. 2a and 2b. FIG. 2a illustrates operation of the protocol in the situation in which the transaction commits. FIG. 2b illustrates operation of the protocol in the situation in which the transaction aborts. FIGS. 2a and 2b are best viewed in conjunction. In protocol 200, messages are communicated between a coordinator 202 and one or more participants 204. Coordinator 202 is the component that runs the two-phase commit protocol on behalf of one transaction, that is, the coordinator is the component that receives the commit or abort request and drives the execution of the protocol. Participants 204 are resource managers that do work on behalf of the transaction, for example, by reading and updating resources. The goal is to ensure that the coordinator and all participants commit the transaction, as shown in FIG. 2, or the coordinator and all participants abort the transaction, as shown in FIG. 4.

A resource manager is a term used to describe the role of system components that manage the operation of resources, such as DBMSs. A resource is a term used to describe an item that is managed by a resource manager, such as a database managed by a DBMS. The terms "resource manage" and "resource," are used to broaden the description of the system components that are used in the two-phase commit protocol because, when a transaction commits, all of the shared resources it accesses need to get involved in the commitment activity, not just databases. Nondatabase resources include recoverable scratch pad areas, queues, and other communications systems.

The two-phase commit protocol makes the following assumptions about each transaction T:

Transaction T accesses resources from time to time. If it experiences a serious error at any time, such as a deadlock or illegal operation, it issues an abort operation. If it terminates normally without any errors, it issues a commit. In response to the commit, the system runs the two-phase commit protocol.

Each resource manager can commit or abort its part of T, that is, permanently install or undo T's operations that involve this resource manager. Thus, each resource manager typically has a transactional recovery system.

One and only one program issues the commit operation on T. That is, one program decides when to start committing T by running the two-phase commit protocol, and no other program will later start running the protocol on T independently. In some cases, a second attempt to run two-phase commit while the first attempt is still running will cause the protocol to break, that is, will cause it to commit at one resource manager and abort at another. The protocol can be programmed to cope with concurrent attempts to run two-phase commit, but we assume it does not happen.

Transaction T has terminated executing at all resource managers before issuing the commit operation. In general, this can be hard to arrange. If the transaction does all of its communications using RPC, then it can ensure T has finished processing at all resource managers by waiting for all of those calls to return, provided that each resource manager finishes all of the work it was asked to do before returning from the call. If T uses other communications paradigms, such as peer-to-peer, then it has to ensure by some other means that T terminated. For example, the well-known LU6.2 protocol, carefully dovetails two-phase commit with the transaction termination protocol. This assumption allows us to avoid dealing with the complexity of transaction termination here.

Every system and resource manager fails by stopping. That is, the protocol does not make mistakes when its system or a resource manager mal-functions. It either does exactly what the protocol says it should do, or it stops running. It is possible for a failure to cause the protocol to do something that is inconsistent with the specification, such as sending bogus messages.

A participant P is said to be prepared if all of transaction T's after-images at P are in stable storage. It is essential that T does not commit at any participant until all participants are prepared. The reason is the force-at-commit rule, which says not to commit a transaction until the after-images of all of its updates are in stable storage. To see what goes wrong if you break the rule, suppose one participant, P1, commits T before another participant, P2, is pre-pared. If P2 subsequently fails, before it is prepared and after PI commits, then T will not be atomic. T has already committed at PI, and it cannot commit at P2 because P2, may have lost some of T's updates when it failed. On the other hand, if P2 is prepared before P, commits, then it is still possible for T to be atomic after P2 fails. When P2 recovers, it still has T's updates in stable storage (because it was prepared before it failed). After it recovers and finds out that T committed, it too can finish committing T.

Ensuring that all participants are prepared before any of them commits is the essence of two-phase commit. Phase 1 is when all participants become prepared. Phase 2 is when they commit. No participant enters phase 2 until all participants have completed phase 1, that is, until all participants are pre-pared.

The protocol proceeds as follows:

Begin phase 1: To commit the transaction, the coordinator 202 starts by sending a REQUEST-TO-PREPARE message 206 to each participant 204.

The coordinator 202 waits for all participants 204 to "vote" on the request.

In response to receiving a REQUEST-TO-PREPARE message 206, each participant 204 votes by sending a message back to the coordinator, as follows:

It votes PREPARED by sending a PREPARED message 208 if it is prepared to commit.

It may vote NO by sending a NO message 214 for any reason, usually because it cannot prepare the transaction due to a local failure.

It may delay voting indefinitely, usually because its system is overburdened with other work.

Begin phase 2: If the coordinator 202 receives PREPARED messages 208 from all participants 204, it decides to commit. The transaction is now officially committed. Otherwise, it either received at least one NO message 214 or gave up waiting for some participant, so it decides to abort.

The coordinator 202 sends its decision to all participants 204 using COMMIT messages 210 or ABORT messages 216.

Participants 204 acknowledge receipt of the COMMIT messages 210 or ABORT messages 216 by replying with DONE messages 212.

After receiving DONE messages 212 from all participants 204, the coordinator 202 can forget the transaction, mean that it can deallocate any memory it was using to keep track of information about the transaction.

The literature on object-oriented systems was influenced in dramatic ways by the publication of Design Patterns by Gamma et al in the mid-90s. This book cataloged a number of implementation techniques for object based systems that could be reused. Typically, patterns promote flexibility and abstraction. One of the patterns documented by Gamma et al was the Strategy Pattern.

The Strategy Pattern provides the capability to define a family of algorithms, encapsulate each one, and make them interchangeable. Strategy lets the algorithm vary independently from clients that use it. The present invention employs the strategy pattern to create statically or dynamically pluggable presumptions about the recovery semantics of the two phase commit algorithm. The algorithm for the protocol is completely decoupled from the log presumptions. This allows the coordinator to be used in different transaction models, which means that multiple products may leverage the same coordination infrastructure without any changes to the core two phase commit engine.

Figure 3:
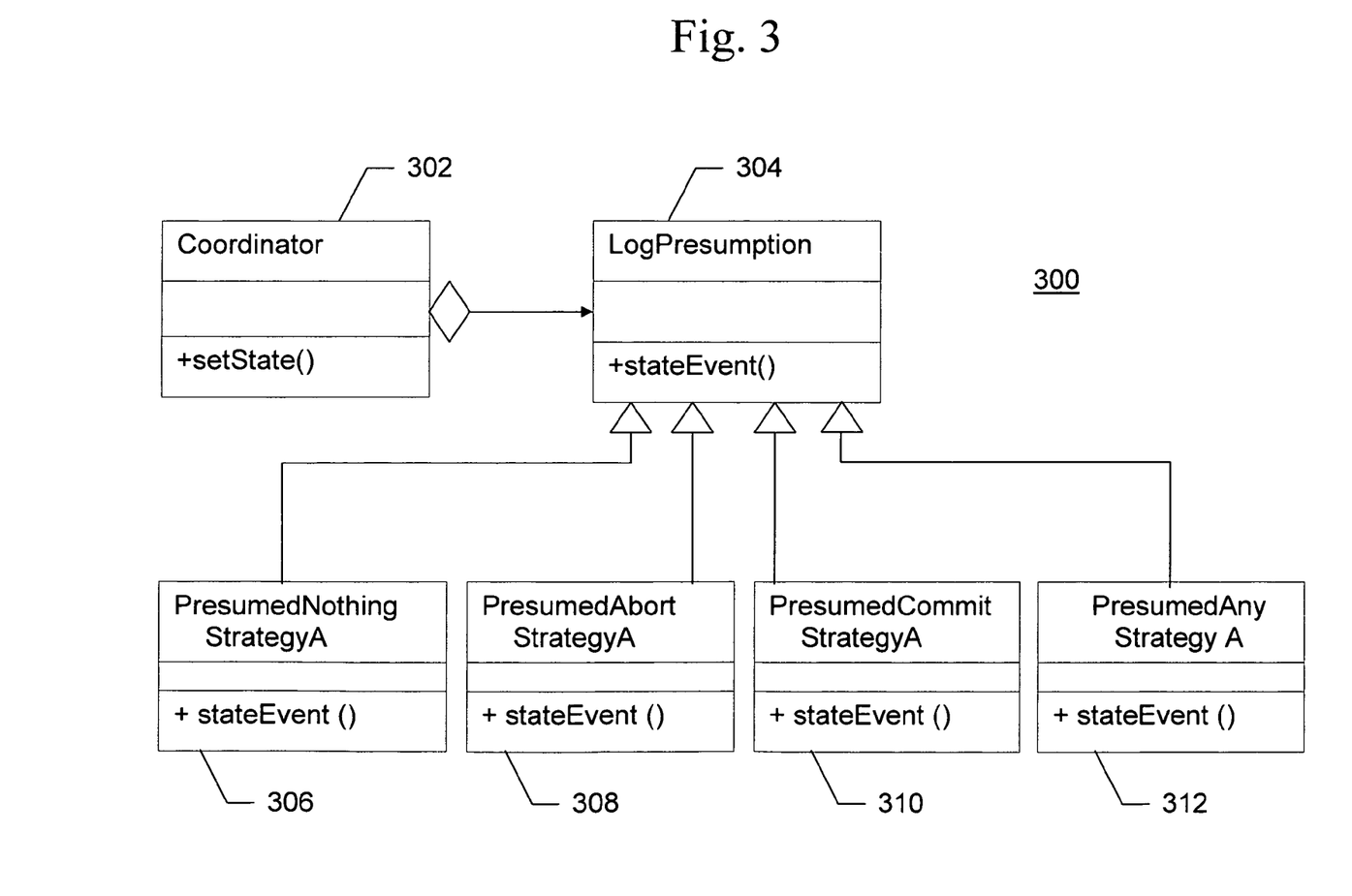
FIG. 3 is an exemplary block diagram of a strategy pattern for pluggable presumptions about the recovery semantics of the two phase commit algorithm.

An example of the strategy pattern 300 for pluggable presumptions about the recovery semantics of the two phase commit algorithm is shown in FIG. 3. Software objects involved in strategy pattern 300 include coordinator 302, LogPresumption object 304, PresumedNothingStrategy object 306, PresumedAbortStrategy object 308, PresumedCommitStrategy object 310, PresumedAnyStrategy object 312.

Figure 4:
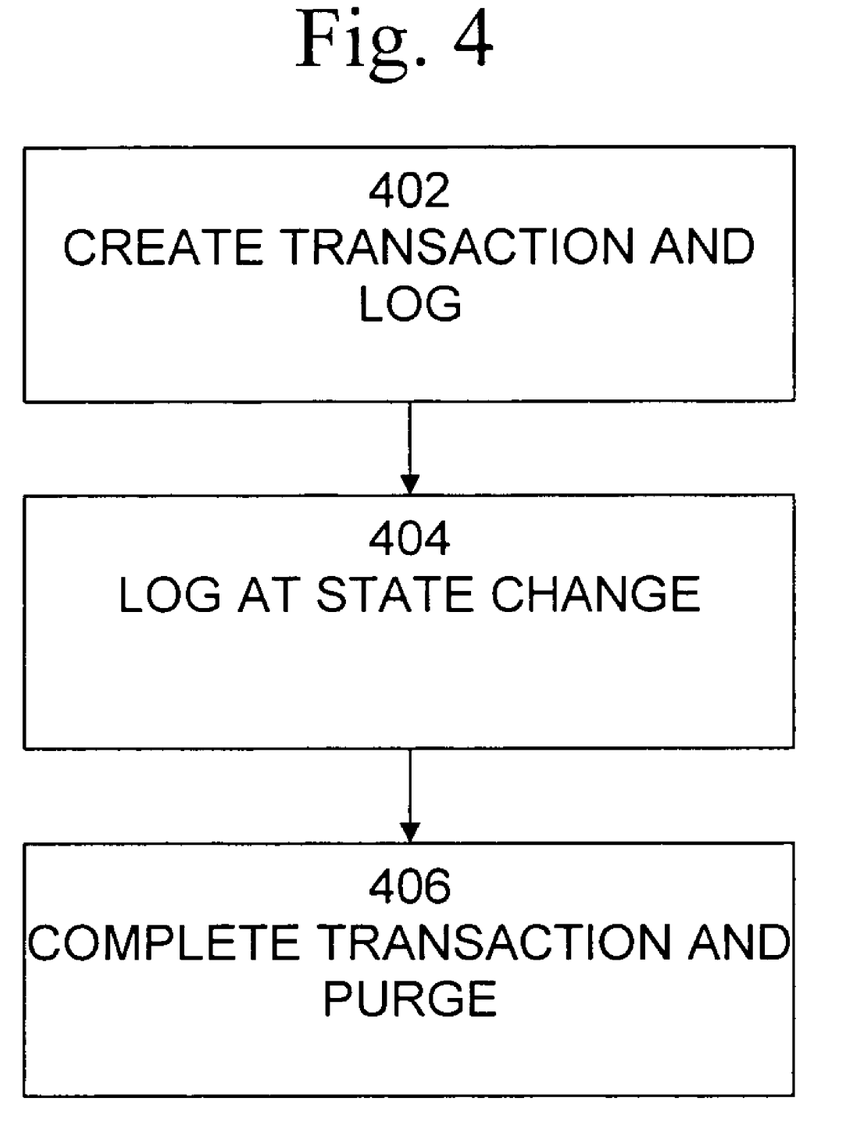
FIG. 4 is an exemplary data flow diagram processing performed in PresumedNothingStrategy presumption.

When the PresumedNothingStrategy object 306 is active as the log presumption, the status of an incomplete or recoverable transaction, or of a resource that is part of such a transaction, is undeterminable without some information about the transaction being present in the logs. In other words, the lack of information about the transaction in the logs is treated as though the transaction had not ever existed or had completed successfully. The scenario where such information necessary for recovery is missing is considered a catastrophic failure, as no consistent recourse can be guaranteed. The processing performed in this presumption is shown in FIG. 4. In step 402, the transaction is created and a log is written to stable storage at creation time. In step 404, a log is written after every state change of the two-phase protocol. In step 406, if the transaction is completed successfully, whether by committing or rolling back all changes, it can forget about the transaction, so the transaction is purged from the logs according to the assumptions just stated. This approach is common in XA based transaction processing.

Returning now to FIG. 3, PresumedAbortStrategy object 308 implements a strategy in which the coordinator does not need to log anything before the commit decision. In this strategy, if, at restart, no record of the transaction is found, it is safe to assume the transaction rolled back. When the PresumedAbortStrategy object 306 is active as the log presumption, an algorithm is used that interprets a lack of knowledge about a transaction or a lack of a log of the transaction as meaning that the transaction has aborted (rolled back) cleanly. The transaction may never have existed in the first place, but for this protocol-type it can be treated as if it aborted and the state is for all intents the same. This being the case, the only logging necessary is when the transaction-processing has begun the committing phase and therefore this presumption provides a significant performance enhancement due to reduced (file) writes. This approach is common in OTS based transaction processing.

When the PresumedCommitStrategy object 310 is active as the log presumption, an algorithm is used that interprets a lack of knowledge about a transaction or a lack of a log of the transaction as meaning that the transaction has committed successfully. This presumption is rarely, if at all, used in commercial practice.

Figure 5:
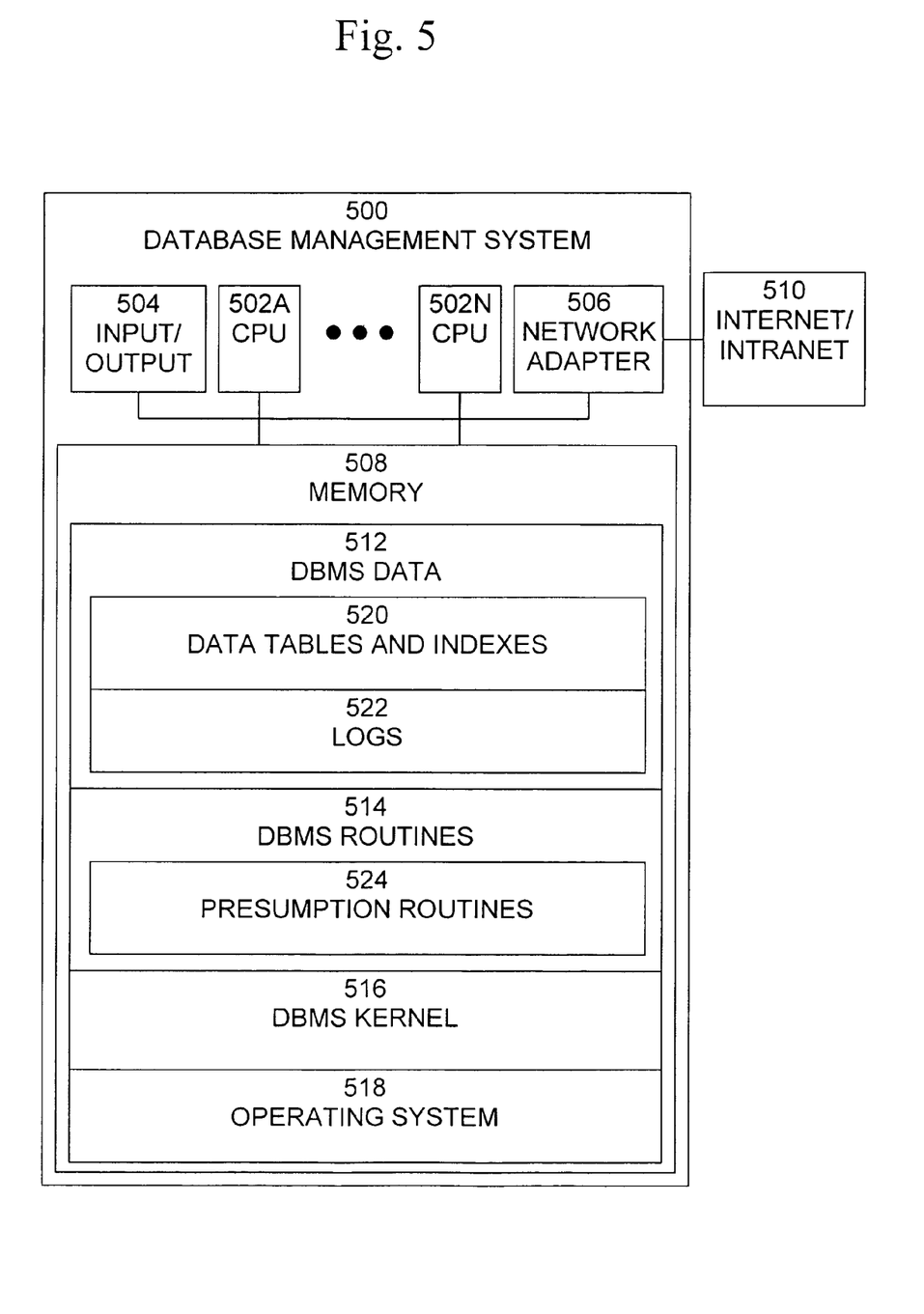
FIG. 5 is an exemplary block diagram of transaction processing system, in which the present invention may be implemented.

An exemplary block diagram of a database management system 500, in which one or more database management systems may be implemented, is shown in FIG. 5. System 500 is typically a programmed general-purpose computer system, such as a personal computer, workstation, server system, and minicomputer or mainframe computer. System 500 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which System 500 is implemented as a single multi-processor computer system, in which multiple processors 502A-502N share system resources, such as memory 508, input/output circuitry 504, and network adapter 506. However, the present invention also contemplates embodiments in which System 500 is implemented as a plurality of networked computer systems, which may be single-processor computer systems, multi-processor computer systems, or a mix thereof.

Input/output circuitry 504 provides the capability to input data to, or output data from, database/System 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces database/System 500 with Internet/intranet 510. Internet/intranet 510 may include one or more standard local area network (LAN) or wide area network (WAN), such as Ethernet, Token Ring, the Internet, or a private or proprietary LAN/WAN.

Memory 508 stores program instructions that are executed by, and data that are used and processed by, CPU 502 to perform the functions of system 500. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface.

In the example shown in FIG. 5, memory 508 includes database management system (DBMS) data 512, DBMS routines 514, database kernel 516 and operating system 518. DBMS data 512 includes DBMS data tables and indexes 520. DBMS data tables 520 include a plurality of data tables, such as relational database data tables, and a plurality of indexes on those data tables. In addition, DBMS data 512 includes logs 522, in which transaction state information is logged.

DBMS routines 514 provide the functionality of DBMS in which the present invention is implemented, such as low-level database management functions, such as those that perform accesses to the database and store or retrieve data in the database. Such functions are often termed queries and are performed by using a database query language, such as Structured Query Language (SQL). SQL is a standardized query language for requesting information from a database. DBMS routines 524 include presumption routines 524, which implement the recovery presumption mechanism. Database kernel 516 provides overall DBMS functionality. Operating system 518 provides overall system functionality.

As shown in FIG. 5, the present invention contemplates implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A transaction processing system comprising:
a processor to execute computer program instructions;
a memory to store the computer program instructions executable by the processor; and
the computer program instructions stored in the memory and executable to implement:
a coordinator receiving a commit or abort request for a transaction and performing a two-phase commit protocol on behalf of the transaction; and
one unit for transaction logging writing log information pertaining to a transaction for use upon recovery of the transaction from a failure in which a result of the two-phase commit protocol for the transaction is incomplete or undetermined, the one unit for transaction logging comprising:
a strategy pattern interchangeably encapsulating all of a plurality of log presumption strategies used by the one unit for transaction logging to create statically or dynamically pluggable presumptions about the recovery semantics of the two-phase commit protocol,
wherein the plurality of interchangeably encapsulated log presumption strategies includes a strategy that proceeds as though the result of the two-phase commit protocol for the transaction is that the transaction was aborted, a strategy that proceeds as though the result of the two-phase commit protocol for the transaction is that the transaction was committed, and a strategy that obtains further information relating to the result of the two-phase commit protocol for the transaction before proceeding;
wherein the strategy pattern is operable to select a log presumption strategy from among the plurality of log presumption strategies and the transaction processing system further comprises a transaction logging unit writing to a log information relating to the transaction based upon the selected log presumption strategy; and
wherein if the selected log presumption strategy is the strategy that obtains further information relating to the result of the two-phase commit protocol for the transaction before proceeding, the transaction logging unit writes to a log information relating to the transaction when the transaction is created, writes to a log information relating to the transaction after a state change of the two-phase protocol, and purging the information relating to the transaction from the log when the transaction is completed.

2. The transaction processing system of claim 1, wherein if the selected log presumption strategy is the strategy that proceeds as though the result of the two-phase commit protocol for the transaction is that the transaction was aborted, the transaction logging unit writes to a log information relating to the transaction when coordinator has begun a committing phase of the two-phase commit protocol.

3. In a transaction processing system, a method of transaction processing comprising:

receiving, by a computer processor, a commit or abort request from a transaction;

performing a two-phase commit protocol on behalf of the transaction;

recovering from a failure of the transaction processing or a transactional participant resource system that causes a result of the two-phase commit protocol for the transaction to be incomplete or to be undetermined by performing a recovery process on the transaction, the recovery process performed using log information written by one unit for transaction logging comprising:

providing a strategy pattern interchangeably encapsulating all of a plurality of log presumption strategies used by the one unit for transaction logging to create statically or dynamically pluggable presumptions about the recovery semantics of the two-phase commit protocol, wherein the plurality of interchangeably encapsulated log presumption strategies includes a strategy that proceeds as though the result of the two-phase commit protocol for the transaction is that the transaction was aborted, a strategy that proceeds as though the result of the two-phase commit protocol for the transaction is that the transaction was committed, and a strategy that obtains further information relating to the result of the two-phase commit protocol for the transaction before proceeding;

further comprising selecting a log presumption strategy from among the plurality of log presumption strategies and writing to a log information relating to the transaction based upon the selected log presumption strategy; and wherein if the selected log presumption strategy is the strategy that obtains further information relating to the result of the two-phase commit protocol for the transaction before proceeding, the transaction logging unit writes to a log information relating to the transaction when the transaction is created, writes to a log information relating to the transaction after a state change of the two-phase protocol, and purges the information relating to the transaction from the log when the transaction is completed.

4. The method of claim 3, wherein if the selected log presumption strategy is the strategy that proceeds as though the result of the two-phase commit protocol for the transaction is that the transaction was aborted, the transaction logging unit writes to a log information relating to the transaction when coordinator has begun a committing phase of the two-phase commit protocol.

5. The system of claim 1, wherein the transaction logging unit performs a log presumption strategy based on dynamic selection of the strategy based on capabilities of transaction participants.

6. The method of claim 3, wherein the recovery process further comprises performing a log presumption strategy based on dynamic selection of the strategy based on capabilities of transaction participants.

7. A computer program product for performing transaction processing in a transaction processing system, the computer program product comprising a non-transitory computer-readable storage medium having computer program instructions recorded thereon, the computer program instructions executable by a processor for performing:

receiving a commit or abort request from a transaction;

performing a two-phase commit protocol on behalf of the transaction;

recovering from a failure of the transaction processing or a transactional participant resource system that causes a result of the two-phase commit protocol for the transaction to be incomplete or to be undetermined by performing a recovery process on the transaction, the recovery process performed using log information written by one unit for transaction logging comprising:

providing a strategy pattern interchangeably encapsulating all of a plurality of log presumption strategies used by the one unit for transaction logging to create statically or dynamically pluggable presumptions about the recovery semantics of the two-phase commit protocol, wherein the plurality of interchangeably encapsulated log presumption strategies includes a strategy that proceeds as though the result of the two-phase commit protocol for the transaction is that the transaction was aborted, a strategy that proceeds as though the result of the two-phase commit protocol for the transaction is that the transaction was committed, and a strategy that obtains further information relating to the result of the two-phase commit protocol for the transaction before proceeding;

further comprising selecting a log presumption strategy from among a plurality of log presumption strategies and writing to a log information relating to the transaction based upon the selected log presumption strategy; and wherein if the selected log presumption strategy is the strategy that obtains further information relating to the result of the two-phase commit protocol for the transaction before proceeding, the transaction logging unit writes to a log information relating to the transaction when the transaction is created, writes to a log information relating to the transaction after a state change of the two-phase protocol, and purges the information relating to the transaction from the log when the transaction is completed.

8. The computer program product of claim 7, wherein if the selected log presumption strategy is the first strategy that proceeds as though the result of the two-phase commit protocol for the transaction is that the transaction was aborted, the transaction logging unit writes to a log information relating to the transaction when coordinator has begun a committing phase of the two-phase commit protocol.

9. The computer program product of claim 7, wherein the recovery process further comprises performing a log presumption strategy based on dynamic selection of the strategy based on capabilities of transaction participants.

* * * * *

UNITED STATES PATENT AND TRADEMARK OFFICE
CERTIFICATE OF CORRECTION

| | | |
|---|---|---|
| PATENT NO. | : 8,271,448 B2 | Page 1 of 1 |
| APPLICATION NO. | : 11/044267 | |
| DATED | : September 18, 2012 | |
| INVENTOR(S) | : Parkinson et al. | |

It is certified that error appears in the above-identified patent and that said Letters Patent is hereby corrected as shown below:

In column 4, line 61, delete "pre-pared." and insert -- prepared. --, therefor.

In column 4, line 62, delete "PI" and insert -- P1 --, therefor.

In column 4, line 63, delete "PI," and insert -- P1, --, therefor.

In column 5, line 8, delete "pre-pared." and insert -- prepared. --, therefor.

In column 10, line 41, in Claim 7, delete "among a" and insert -- among the --, therefor.

Signed and Sealed this
Eighteenth Day of December, 2012

David J. Kappos
*Director of the United States Patent and Trademark Office*